Sept. 14, 1926.

N. T. KELSO 1,600,048

ALTERNATING CURRENT MOTOR

Filed Sept. 8, 1924

Inventor
Newton T. Kelso
by
His Attorney

Patented Sept. 14, 1926.

1,600,048

UNITED STATES PATENT OFFICE.

NEWTON T. KELSO, OF FORT WAYNE, INDIANA, ASSIGNOR TO GENERAL ELECTRIC COMPANY, A CORPORATION OF NEW YORK.

ALTERNATING-CURRENT MOTOR.

Application filed September 8, 1924. Serial No. 736,441.

My invention relates to alternating current motors and more particularly to such motors of the single phase commutator type, which start as repulsion motors and run as induction motors.

Motors of this type are usually provided with some form of centrifugally operated switching device which is arranged to short-circuit all of the secondary windings of the motor when the motor comes up to speed. Such devices as have been heretofor proposed have been operative but have left something to be desired in their certainty of action whenever the motor attained the desired speed at which the device was intended to operate.

My invention comprises a new and novel short-circuiting device in which the ratio of the force exerted by the resilient means tending to hold the device in the open circuited position to the centrifugal force tending to move the device into the short-circuited position reduces as the speed of the motor increases. This results in that my short-circuiting device when it starts to close, moves with a snap action and closes the circuit instantly and at the speed at which it was designed to operate.

Figure 1:
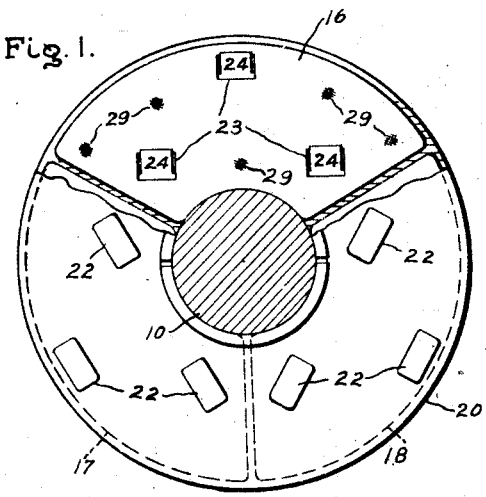
Figure 2:
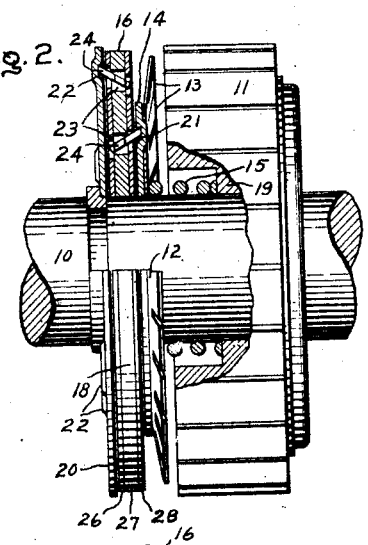
Figure 3:
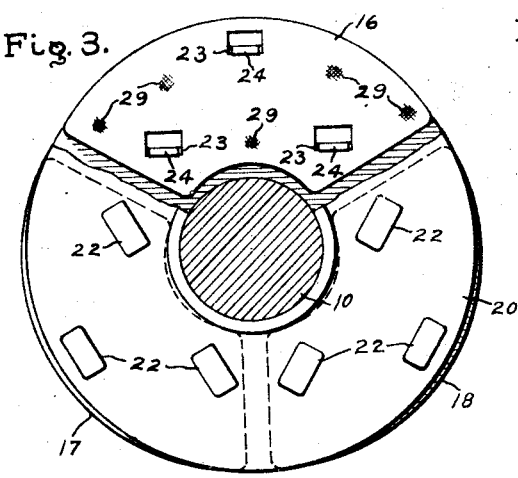
Figure 4:
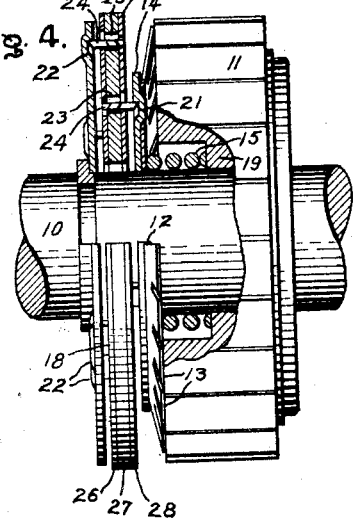
Figure 5:
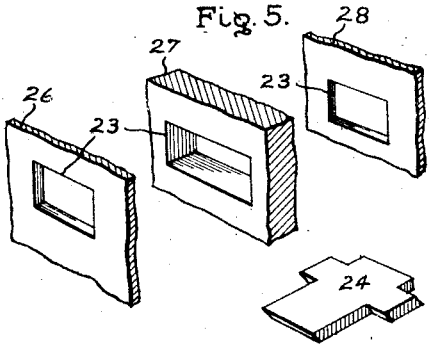

The construction and operation of my invention can best be understood and described in connection with the accompanying drawings, in which Fig. 1 is an end elevation of any short circuiting device as mounted on the shaft of a motor; Fig. 2, shows a fragmentary sectional side view of the device of Fig. 1; Fig. 3 shows an end elevation of the device after the centrifugal means have operated; Fig. 4, shows a side view partly in section of the device with the various parts in the positions shown in Fig. 3, and Fig. 5, is an enlarged view of a detail.

Referring now to the drawing, 10 denotes the shaft of a motor which carries a commutator 11, the segments of which are insulated therefrom in any suitable manner.

Disposed on the shaft 10 and arranged to move axially there along is a member comprising a plate 14 and a conducting ring 12 fastened thereto and provided with a plurality of flexible fingers 13 arranged to engage the ends of the commutator segments as shown in Fig. 4 to short circuit the same. This member moves against a spring 15 which tends to maintain the ring 12 in an inoperative position and out of engagement with the commutator. The spring 15 is shown as surrounding the shaft and reacting against a portion of the commutator spider 19.

This axial movement of the ring 12 and plate 14 against the spring 15 is caused by the radial movement of the three segmental weights 16, 17 and 18 disposed symmetrically about the shaft 10. The positions of the weights 16, 17 and 18 about the shaft is fixed and guided by an annular abutment 20 which is secured to the shaft 10 and disposed on the other side of said weights from the ring 12.

The stiffening plate 14 and the abutment 20 are provided with recesses 21 and 22 respectively and the segmental weights 16, 17, and 18 have slots 23 which carry members 24. These members 24 are movably held within the slots 23. In order to facilitate the assembly of these members 24 with the weights 16, 17 and 18, each of the weights is made up in three sections, 26, 27 and 28, (see Fig. 5). These three sections are spot welded together at the points 29 after the members 24 are in place. The slots 23 in the middle sections 27 are wider than the slots in the end sections 26 and 28. The members 24 have tongues 25 which are placed in the slots in the middle sections 27 and are locked therein when the end sections 26 and 28 are secured to the middle section 27. The sections 26 and 28 are made thinner than the middle section 27 and can, if desired be made of harder material such as steel, while the middle section can be made of cheaper material.

The members 24 as mounted within the weights 16, 17 and 18 are movable and operate as if they were pivoted thereto. The edges of the members 24 are sharpened to form knife-edges, so as to reduce the friction of the device and also make their action more uniform. When the weights 16, 17 and 18 and the members 24 are assembled and in operation the latter engage the recesses 21 and 22 in the plate 14 and the abutment 20 respectively. As the weights move radially in response to centrifugal force, the members 24 assume different angular positions with respect to the shaft and in so doing they project out from the weights and cause the plate 14 to move axially along the shaft 10 thus bringing the ring 12 into engagement with the commutator segments and short circuiting the same.

The slots 23 in the weights 16, 17 and 18 and the recesses 21 and 22 are arranged in groups there being three of each in each group and one group for each weight. Some of the slots 23 are arranged at different distances from the center of the shaft 10, the outer slots coinciding with the recesses 22 in the abutment 20 and the inner slots 21 coinciding with the recesses 21 in the plate 14. When the members 24 are proportioned so that they lie in a plane substantially at a 45 degree angle to the shaft center line when the short circuiting device is in the inoperative position, the ratio of the force exerted by the spring 15 to that exerted by the weights 16, 17 and 18 will be substantially 1 to 1, but by varying this angle, the above ratio can be changed to any desired value. For instance, if the angle referred to above is lessened this ratio will be decreased and vice versa. This ratio is the ratio between the two respective forces at the time the weights begin to move and decreases as the weights move outwardly. This is explained by the fact that as the weights move outwardly the above referred to angle constantly decreases. This latter feature is particularly advantageous in a device of this character since it produces a snap action between the short circuiting ring 12 and the commutator 11 and as a result gives a quick acting short circuiting device, which is a very desirable feature since it insures the operation of the device at the desired speed.

The operation of my invention is as follows: The motor is started with the commutator 11 cooperating with suitable brushes as a repulsion motor.

As the machine, running as a repulsion motor, comes up to speed the weights 16, 17 and 18 will move radially outward by the action of centrifugal force. These weights accordingly move outwardly from the inner position shown in Fig. 2, to their outward position shown in Fig. 4 and by so doing cause the pivoted members 24 to straighten out between the weights and the abutment 20 and between the weights and the plate 14 and thereby exert a pressure upon the plate 14 which compresses the spring 15, translating the radial movement of the weights 16, 17 and 18 into an axial movement which causes the ring 12 to move against and short circuit the segments of the commutator 11. After the segments of the commutator 11 are short circuited, the motor will operate as an induction motor.

When the motor stops there is no longer any centrifugal force to keep the weights 16, 17 and 18 in their outward position. The pressure of the spring 15 will then exert a force through the members 24 which will cause the weights 16, 17 and 18 to move back in to their inner position and at the same time move the ring 12 away from the commutator segments so that the machine may again start as a repulsion motor when current is next turned on.

Having now described an embodiment of my invention which is at present the best means known to me for carrying the same into effect, I would have it understood that this is merely illustrative, and that I do not mean to be limited thereby to the precise details shown, nor restricted in the choice of recognized equivalents except as defined in my claims hereunto annexed.

What I claim as new and desire to secure by Letters Patent of the United States is:—

1. In an alternating current motor having a rotor shaft and a commutator thereon, means for short circuiting said commutator comprising a member axially movable with respect to said shaft, a plurality of weights disposed about said shaft and adapted to move radially relative to said shaft in response to centrifugal force, resilient means tending to maintain said member in an inoperative position, an abutment secured to said rotor shaft, and elongated members interposed between said member and said weights and between said abutment and said weights whereby as said weights move radially in response to centrifugal force said commutator will be short circuited.

2. In an alternating current motor having a rotor shaft and a commutator thereon, means for short circuiting said commutator comprising a member axially movable with respect to said shaft, a plurality of weights disposed about said shaft and adapted to move radially relative to said shaft in response to centrifugal force, resilient means tending to maintain said member in an inoperative position, an abutment secured to said rotor shaft, and pivoted knife edged members interposed between said member and said weights and between said abutment and said weights whereby as said weights move radially in response to centrifugal force said commutator will be short circuited.

3. In an alternating current motor having a rotor shaft and a commutator thereon, means for short circuiting said commutator comprising a member axially movable with respect to said shaft, a plurality of weights disposed about said shaft and adapted to move radially relative to said shaft in response to centrifugal force, said weights having slots therein, resilient means tending to maintain said member in an inoperative position, an abutment secured to said rotor shaft, pivoted members interposed between said member and said weights and between said abutment and said weights whereby as said weights move radially in response to centrifugal force the commutator will be short circuited, and tongues on said pivoted members interlocking with the slots in said weights.

4. In an alternating current motor having a rotor shaft and a commutator thereon, means for short circuiting said commutator comprising a member axially movable with respect to said shaft and having recesses therein, a plurality of weights disposed about said shaft and adapted to move radially relative to said shaft in response to centrifugal force, said weights having slots therein, resilient means tending to maintain said member in an inoperative position, an abutment secured to said rotor shaft also having recesses therein, and pivoted knife edged members having tongues thereon interposed between said member and said weights and between said abutment and said weights whereby as said weights move radially in response to centrifugal force said commutator will be short circuited, said tongues on said pivoted members interlocking with the slots in said weights and the knife edges of said pivoted members engaging the recesses in said member and in said abutment.

5. In an alternating current motor having a rotor shaft and a commutator thereon, means for short circuiting said commutator comprising a member axially movable with respect to said shaft, a plurality of weights disposed about said shaft and adapted to move radially relative to said shaft in response to centrifugal force, resilient means tending to maintain said member in an inoperative position, an abutment secured to said rotor shaft, and members each having a pivotal connection with said member and with one of said weights and members each having a pivotal connection with said abutment and with one of said weights whereby as said weights move radially in response to centrifugal force said commutator will be short circuited.

6. In an alternating current motor having a rotor shaft and a commutator thereon, means for short circuiting said commutator comprising a member axially movable with respect to said shaft, a plurality of weights disposed about said shaft and adapted to move radially relative to said shaft in response to centrifugal force, said weights having slots therein, resilient means tending to maintain said member in an inoperative position and pivoted members mounted in said slots in said weights and arranged to be moved from an inclined position into substantial parallelism with the shaft when said weights move out by centrifugal force, said pivoted members in said movement engaging said member and moving it to cause said commutator to be short circuited.

7. In an alternating current motor having a rotor shaft and a commutator thereon, means for short circuiting said commutator comprising a member axially movable with respect to said shaft, a plurality of weights disposed about said shaft and adapted to move radially relative to said shaft in response to centrifugal force, said weights having slots therein, resilient means tending to maintain said member in an inoperative position, and pivoted members having tongues thereon, said tongues engaging said slots in said weights so as to lock said pivoted members in said weights, said pivoted members being arranged to be moved from an inclined position to a position substantially parallel with the shaft when said weights move out by centrifugal force, said pivoted members in said movement engaging said member and causing said commutator to be short circuited.

8. In an alternating current motor having a rotor shaft and a commutator thereon, means for short-circuiting said commutator comprising a member axially movable with respect to the shaft, resilient means opposing said movement, a centrifugal weight adapted to move outwardly in response to a predetermined speed of the shaft, and an elongated member having pivotal engagement at spaced points respectively with the weight and with the member.

In witness whereof, I have hereunto set my hand this 3rd day of Sept., 1924.

NEWTON T. KELSO.